Figure 1:
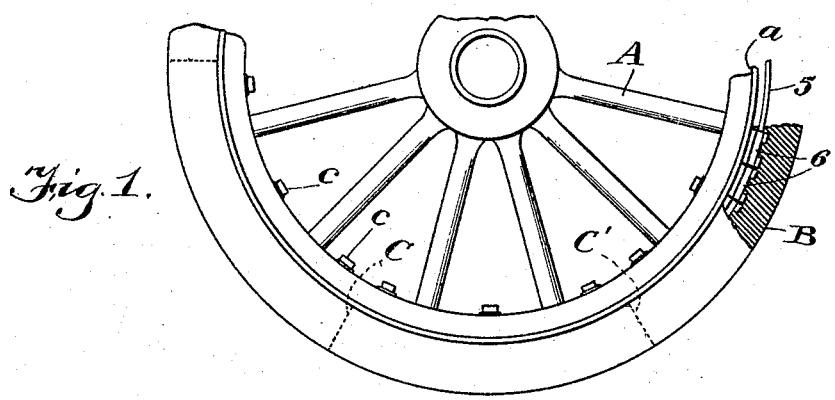

No. 785,118. PATENTED MAR. 21, 1905.
C. A. PETTIE.
VEHICLE TIRE.
APPLICATION FILED MAY 2, 1904.

WITNESSES:
Robert Head
V. E. Nichols.

INVENTOR
Charles A. Pettie,
BY
Griffin Burkhard & Cavanagh
ATTORNEYS

No. 785,118. Patented March 21, 1905.

UNITED STATES PATENT OFFICE.

CHARLES A. PETTIE, OF NEW YORK, N. Y.

VEHICLE-TIRE.

SPECIFICATION forming part of Letters Patent No. 785,118, dated March 21, 1905.

Application filed May 2, 1904. Serial No. 206,048.

*To all whom it may concern:*

Be it known that I, CHARLES A. PETTIE, a citizen of the United States, residing at the city of New York, borough of Brooklyn, in the county of Kings and State of New York, have invented certain new and useful Improvements in Vehicle-Tires; and I do hereby declare that the following is a full, clear, and exact description of the same.

My invention relates to improvements in vehicle-tires of that class designed for service on automobiles and on heavy vehicles, although the improved tire may be used with good results on vehicles generally.

A serious defect in the practical service of solid-rubber or elastic tires is the tendency of the resilient body to creep circumferentially or "hill up" on the rotary motion of the wheel, said objection being caused, primarily, by the weight of the vehicle, which is superposed on the tires, displacing the elastic body of rubber therein. This objectionable tendency of the tire to hill up in front of the wheel seriously impairs the security of the attachment of the elastic tread to the wheel-felly, and it almost invariably results in the rupture or breakage of the side portions of the tread after the tire is in service for a short time, thus weakening the tire at vital points, making it present an unsightly appearance, forming surfaces for the lodgment of dirt and mud, and allowing the elements to have a deteriorating influence on the rubber and the anchoring devices of the elastic tread.

One object of the present invention is to produce an improved construction wherein these objectionable features are overcome, and at the same time I produce a solid base which effectually anchors the elastic tread so firmly on the felly as to prevent pulling away and breakage of the side portions of the tire, where the rupture always starts.

My new construction is also characterized by a novel form of base, which consists of sections adapted to be assembled easily and quickly and to be united solidly to an endless tread, the whole tire being capable of application to a felly in a strong and substantial manner. Said sections of the base are peculiar in that each is built up or composed of a number of separate members assembled in spaced relation on a common metallic binder in the form of a segmentally-curved bar. In making the tire the segmental sections are assembled end to end, so as to produce a circular base, the binders thereof being held by any suitable temporary devices, and "green" rubber is applied to the slot, openings, or spaces provided in the members between the members and between the sections, as well as over the base, after which the whole is placed in a suitable vulcanizing-mold. The endless tread has interlocking or rooted engagement at numerous places with the several sections and the large number of members of the base, and it is also anchored continuously along both sides to said base in order to prevent the side portions of the tread from pulling away from said base.

The described construction secures such an intimate relation of the tread to the base as to overcome pulling away of the tread from the base when the tread hills up, and a portion of the rubber fills the spaces between the adjacent end of the sections and down to the inner edge of the tire-felly, so as to absorb a portion of the displaced rubber due to the "hilling."

In ordinary solid-rubber tires during the displacement of the tread in the operation of "hilling up" the strain or pull of the tread is brought directly on anchoring devices at the base of the tread just next to the felly. My construction, however, has the members so arranged that the strain or pull of the tread is exerted on certain slats or cross-pieces at the surfaces of the members and located above the foundation-pieces at the under side of the base, and thus the strain of the tread can have no objectionable effect on the anchored or rooted side portions of said elastic tread.

My new construction of the tire is furthermore distinguished from prior devices of its class by the ability to repair and replace a broken or injured portion of the elastic tread.

Further objects and advantages of the invention will appear in the course of the subjoined description, and the actual scope of the invention will be defined by the annexed claims.

Reference is to be had to the accompanying drawings, forming a part of this specification, in which like characters of reference are used to indicate corresponding parts in all the figures.

Figure 2:
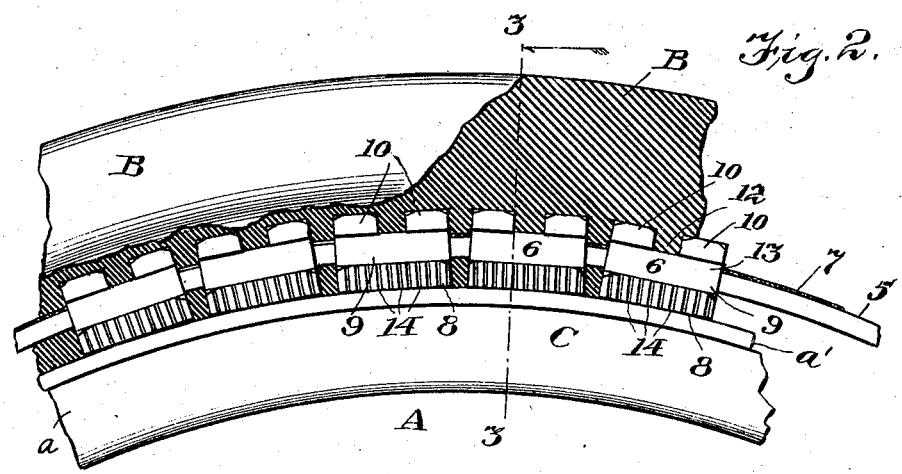
Figure 3:
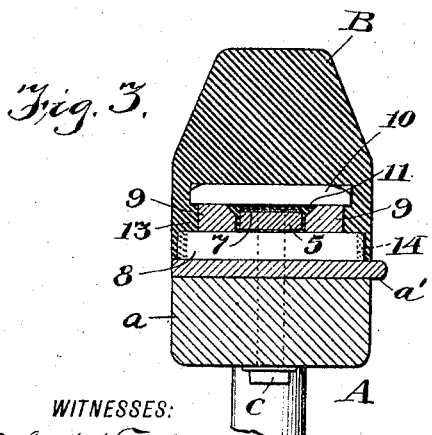
Figure 4:
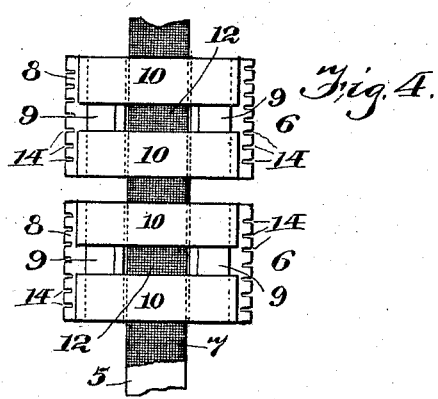

Figure 1 is a side elevation of a portion of a wheel with my solid-rubber tire applied thereto. Fig. 2 is an enlarged sectional elevation illustrating more clearly the construction of the base for the elastic tread. Fig. 3 is a cross-section on the plane indicated by the dotted line 3 3 of Fig. 2; and Fig. 4 is a detail plan view of a portion of one section of the base, the elastic tread being omitted.

In Fig. 1 a portion of an ordinary vehicle-wheel is indicated at A, the same having a felly $a$ and a rim $a'$ of any suitable character. Against this felly is applied a base or foundation, to be hereinafter described, for the purpose of anchoring an elastic tread B securely on the felly in a way to overcome the effect of the hilling up of the tread in front of the wheel in the service of the latter.

The base or foundation is constructed in sections, (indicated at C C' in Fig. 1,) said sections being fitted to the wheel-felly and secured or fastened individually thereto by suitable means—as, for example, by the bolts $c$.

Each section of the base contemplates the employment of a binder 5 and a plurality of members 6, the latter being fitted on the binder and arranged in spaced positions thereon. The binder 5 is a segmentally-curved bar or length of metal of any desired cross-sectional form, and on the convex surface of this bar is fitted and secured a layer or ply of suitable fabric 7, the latter being held to the binder by the slats of the members and said fabric having a tendency to secure the desired adhesion of the rubber of the tread B to the metallic binder. Each member 6 of a section is made or built up of pieces of suitable material, such as wood, in a way to provide a space for the reception of the metallic binder and also to produce openings, slots, or spaces to be filled in by rubber of the tire-tread in the operation of molding the rubber around the base or foundation. As shown, each section consists of a foundation piece or block 8, parallel strips or lengths 9, and cross pieces or slats 10. The foundation-piece 8 is shown as consisting of a single block of wood of the required size and shape, although it may consist of two or more pieces, as desired. The spacing lengths or strips 9 are laid upon and fastened to the foundation-piece, so as to be parallel to each other and to leave an intermediate space 11. On top of the spacing lengths or strips are secured the cross-slats 10, which are at an angle to the strips 9 and are spaced apart a suitable distance to leave an opening 12. The spacing lengths or strips 9 are disposed within the edges of the foundation-piece 8 and the cross-slats 10, so as to provide grooves or spaces 13 at the side edges of the member. The edges of the foundation-piece 8 have slits or kerfs 14, in which rubber of the elastic tread B is embedded when the tread is molded around the base or foundation.

The cross-sectional area of the space 11 within the member 6 exceeds that of the metallic binder 5, so that each wooden member fits loosely on the binder in a way to have a certain amount of play thereon in the assemblage of the parts comprising the section. It is to be understood that the members fit on the binder to leave a certain amount of space between the parts of the member and the faces of the binder, and this space is designed to be filled with rubber when the tread is molded around the base.

The metallic binder 5 of each section may be of any desired length to contain the proper number of wooden members, and when the completed tire is applied to the wheel-felly the binders are fastened to said felly by means of the bolts $c$, which are shown as passing through the felly and as having their outer ends screwed into threaded holes provided at suitable points in the metallic binder. Each binder is adapted for the reception of three bolts; but the number is immaterial and may be increased or decreased, if desired. The metallic binders act against the foundation-pieces 8 of the number of wooden members respectively in the sections, and said binders draw or clamp the members laterally against the felly, the foundation-pieces 8 of said members being interposed between the felly and the binder, as shown more clearly by Fig. 3. Any suitable number of members 6 may be employed in connection with a single or common binder of each section—say, three, four, five, six, or more—but it is evident that the number of members may be varied as desired.

In the operation of making a tire according to this invention the proper number of segmental sections C C' are prepared, each having a metallic binder and a series of slotted members. The segmental sections are now assembled end to end, so as to produce a circular base, and the binders of these sections are engaged by suitable temporary holding devices in order to retain the parts in place. Rubber in strips is applied in the slots, spaces, or openings 12 13 of the base or foundation. The spaces 13 in the sides of the members 6, which extend continuously around the felly, produce grooves at the sides of the base or foundation, which grooves extend around the full length of the base, while the slots 12 provide a multiplicity of spaces across the surface of the base in which the rubber is free to enter during the molding and vulcanizing operation. After having assembled the parts comprising the base and filled the spaces 12 13 with rubber the rubber to form the tread B is applied around the curved surface of the base and the whole is molded and vulcanized in the usual or any preferred manner, and during these operations the rubber is softened by heat and subjected to pressure, so as to flow into and fill the spaces 11, 12, and 13 and the kerfs or slots 14, whereby all parts of the base or foundation are embedded in and covered by an endless rubber tread.

It will be seen that the rubber tread presents a homogeneous structure subsequent to the vulcanization, because all the lengths or strips applied to the base will be merged into and joined with the body portion of the tread. At the side portions of the tread there are projections which fill the grooves or spaces 13, and said side portions of the tread have interlocking engagement with the base practically on continuous lines throughout the length of the tire, the projecting ends of the slats 10 holding the rubber tread down solidly on the base. Said tread is united intimately not only at its side portions to the base, but is also united in a similar manner to the slats 10 and the binders 5 of the plurality of sections, and it also fills the spaces between the ends of the sections down to the inner surface of the tire, so as to be securely interlocked on cross-lines with the base, the tread being practically anchored or rooted in the base so securely that the tendency of the tread to tear off from the wheel is overcome. The union of the tread with the base overcomes the effect of the hilling up, which ordinarily tears off the tire, beginning at the side portions thereof.

From the foregoing description it will be seen that my improved tire contemplates the use of a circular base, which is divided into sections each having a plurality of radially-arranged members, the whole being encompassed by an endless tread which has rooted interlocking engagement with the base at lines along the sides and across the convex face of the base. The arrangement of the members in radial positions and the employment of segmental sections provide spaces in which the rubber is keyed or interlocked on cross-lines.

The base of my tire is made up of wood, which affords a certain degree of cushion, and this base takes up a certain amount of space in the tire, which consequently reduces the quantity of rubber, while at the same time the base is of such construction that the tread is held securely without any liability of pulling away. The position of the base in the tread and the absence of the usual metallic channel allows the compression of the tread without injury thereto and to the rooted engagement of the tread with the base.

My improved tire after its manufacture in the manner described can be easily and readily applied to the wheel-felly and then secured in place so firmly that it cannot be displaced. The fastening is easily and simply performed, and the bolts $c$ draw the metallic binders down against the felly, so as to hold the tire immovably in place on the wheel.

The construction of the base, contemplating the use of the sections as hereinbefore set forth, is an important part of my invention, because provision is made for easily and quickly repairing the tread when it is cut or injured. It is evident that an injured section of the tire, including the tread, and a portion of the base, can be removed by cutting it out or by any other suitable operation, after which a new section of the base, with a section of the tread molded thereon, can be placed in position. The end portions of the inserted tread should fit or join snugly with the undisturbed part of the original tread, and the repaired tire is thus made to present almost a continuous or endless tread.

Changes in the form, size, proportion, and minor details may be made by a skilled mechanic without departing from the spirit or sacrificing the advantages of the invention. I therefore reserve the right to make such modifications and alterations as fairly fall within the scope of the invention as defined by the annexed claims.

Having thus fully described my invention, what I claim as new, and desire to secure by Letters Patent, is—

1. In a tire, a base consisting of sections each having grooves in the sides thereof, and an elastic tread enveloping said sections and interlocking with the grooved sides thereof.

2. A solid tire having a base comprising a plurality of radial spaced members, each formed with grooves at both sides thereof, and an elastic tread covering the base and interlocking along substantially continuous lines and at both side portions thereof with the grooved portions in the members of said base.

3. A solid tire having a base comprising a plurality of radial spaced members and provided at its side portions with longitudinal grooves, and an elastic tread covering the base and interlocking on substantially continuous lines with the side portions of said members of the base, said tread being molded around and filling the grooves of the base, and also having interlocking engagement on transverse lines with said base.

4. A solid tire having a base comprising a plurality of segmental sections each composed of a curved bar and a plurality of members on said bar, an elastic tread united to said members of the base, said tread having substantially continuous interlocking engagement at both of its side portions with the members of the base, and means for securing the curved bars of the segmental sections individually to a wheel-felly.

5. A solid tire having a base formed by a plurality of segmental sections, means for individually securing said segmental sections to a felly, and an elastic tread having interlocking engagement on cross-lines and at the side portions with said sections of the base.

6. A solid tire having a base formed by a plurality of segmental sections, means for attaching the sections individually to a wheel-felly, and an elastic tread having rooted engagement on cross-lines with the sections of the base, and also having interlocking engagement at both side portions and on substantially continuous lines with said base-sections.

7. In a solid tire, a base comprising a plurality of individual segmental sections, each consisting of a curved binder bar or plate and a plurality of members fitted to said binder bar or plate.

8. In a solid tire, a base consisting of a plurality of individual segmental sections, each having a curved binder, and a plurality of grooved members fitted to said binder.

9. In a solid tire, a tread-base consisting of a plurality of curved sections, each having a binder and a plurality of grooved or slotted members engaging with said binder.

10. In a solid tire, a base for an elastic tread comprising a plurality of individual curved sections, each consisting of a rigid binder, a plurality of members having grooves, spaces or slots for the reception of portions of a rubber tread, and means for separately securing the rigid binders of said curved sections to a wheel-felly.

11. In a solid tire, a plurality of segmental sections, each comprising a curved rigid bar or plate and a plurality of members which are fitted loosely to said bar or plate, means for fastening each bar or plate to a wheel-felly, and a tire inclosing the base.

12. In a solid tire, a plurality of segmental plates or bars having means for attachment individually to a wheel-felly, skeletonized members held by said plates or bars, and a tread molded around the members.

13. In a solid tire, a base for an elastic tread consisting of members each having a grooved foundation, and crossing-pieces united to said foundation and producing a space for the reception of a binder.

14. In a solid tire, a base consisting of radial skeletonized members each having a foundation and crossing members, the latter lying in a different plane from the foundation and the whole arranged to produce openings or spaces which extend across and at the sides of the member, and a tread partially enveloping the members and filling the spaces or openings thereof.

15. In a solid tire, a plurality of individual segmental binders, skeleton members held thereby, and a tread filling the members and the spaces between them.

16. In a solid tire, a plurality of individual curved binders, skeleton members spaced on each of the binders, and a tread having rooted engagement with the members and the spaces between them.

17. In a solid tire, a base having a plurality of sections, each comprising a binder and a plurality of skeletonized members thereon, and a tread filling the spaces of the members and inclosing the base.

18. A solid tire having a base comprising a plurality of individual segmental binders, skeleton members held by each of the binders, means for separately securing the binders, and an endless tread enveloping the base and having rooted engagement with said skeleton members; either of the binders together with a number of members and a portion of the tread being adapted for removal without affecting the remainder of the tire.

19. In a tire, a base having a plurality of members, fastening devices each adapted for securing a number of base members to a felly, each fastening device and the members held thereby being independent of other fastening devices and the members secured by the latter, and a tread enveloping said members.

20. In a tire, a base consisting of skeletonized members, a plurality of binders adapted for engagement with a plurality of members, means for attaching the binders to a wheel-felly, and a tread interlocking with said skeletonized members.

21. In a tire, a base consisting of members, a plurality of binders each engaging with a plurality of said members, suitable bolts for fastening said binders to a wheel-felly, and a tread interlocking with said members.

In testimony whereof I hereunto sign my name in the presence of two subscribing witnesses.

CHARLES A. PETTIE.

Witnesses:
H. I. BERNHARD,
V. E. NICHOLS.